Feb. 12, 1935.    J. M. MASTORAS    1,990,792
TRAVELING COUNTER APPARATUS
Filed Dec. 29, 1933    3 Sheets-Sheet 1

Inventor:
James M. Mastoras.
By: Stewart Batcheler
Atty's.

Inventor:
James M. Mastoras.
By Stevens & Batchelor
Atty's.

Feb. 12, 1935. J. M. MASTORAS 1,990,792
TRAVELING COUNTER APPARATUS
Filed Dec. 29, 1933 3 Sheets-Sheet 3
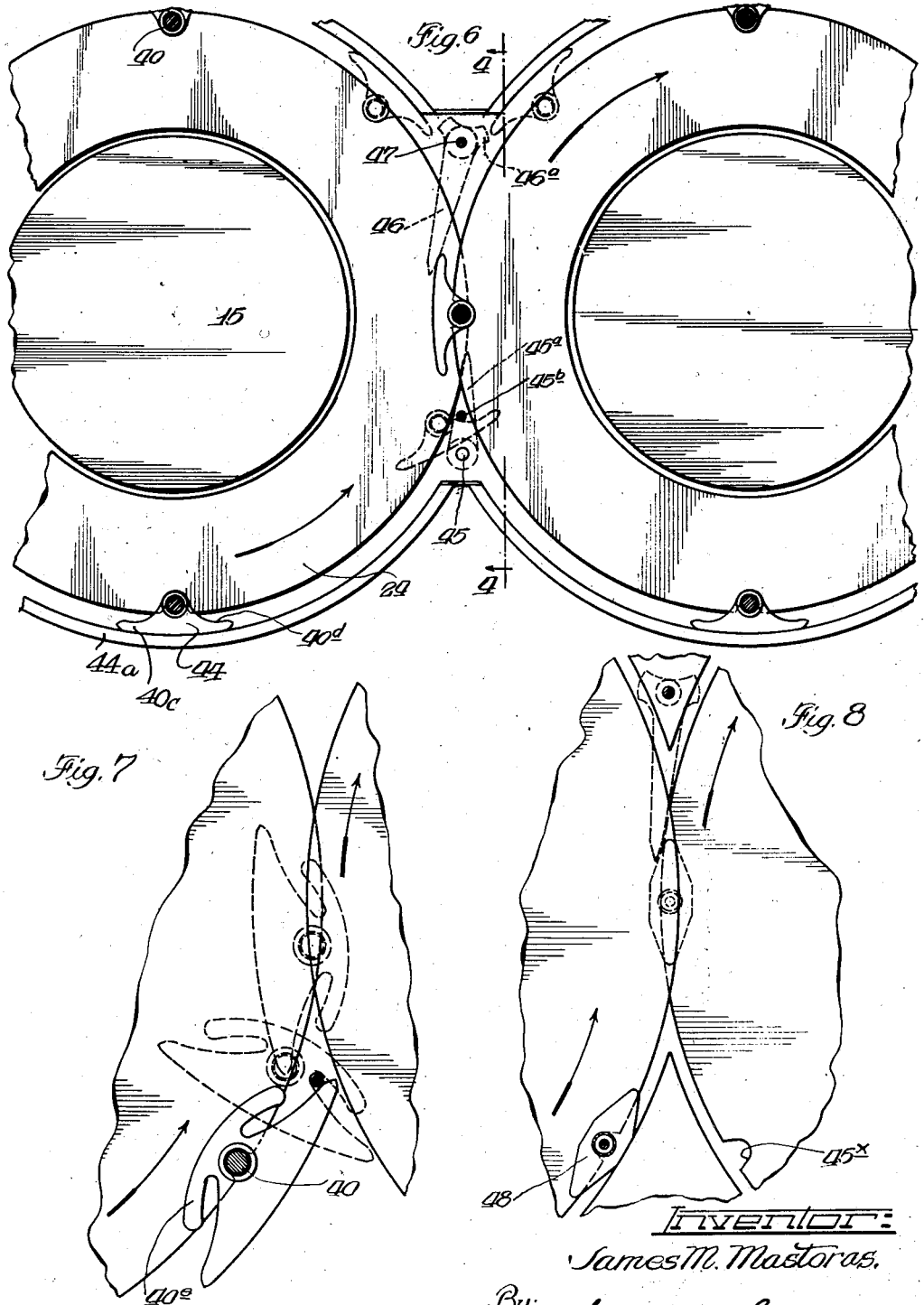

Patented Feb. 12, 1935

1,990,792

UNITED STATES PATENT OFFICE 1,990,792

TRAVELING COUNTER APPARATUS

James M. Mastoras, Chicago, Ill.

Application December 29, 1933, Serial No. 704,547

19 Claims. (Cl. 312—140.1)

My invention relates to rotary counters, more popularly termed as "merry-go-round" bars, and my main object is to provide a new and fascinating development thereof with a view to increasing their popularity.

A further object of the invention is to extend the apparatus to include twin circular counters, laterally spaced and having a synchronized motion.

A still further object of the invention is to design the novel apparatus with a system of seats for the counter patrons, such seats having a traveling motion with the respective counters and also by transfer from one counter to the other and vice versa.

Another object of the invention is to build the novel apparatus with a mechanism whereby to cause the seats to travel about the counters in the form of a figure-8, and to swing the same around at the point of transfer that they may always face the counter with which they move.

An additional object of the invention is to construct the novel apparatus with a center field which is stationary and is adapted to receive plumbing, serving, dispensing and other necessary serving equipment without allowance for or interference by the rotary portion of the apparatus.

An important object of the invention is to build the novel apparatus on lines of simplicity, economy and durability.

With the above objects in view and any others that may suggest themselves from the specification and claims to follow, a better understanding of the invention may be had by reference to the accompanying drawings, in which—

Fig. 6 is a section on the line 6—6 of Fig. 4;

Fig. 7 is a detail view of a modification of the mechanism shown in Fig. 6; and

Fig. 8 is a similar view of another modification.

Circular counters or bars of the merry-go-round type usually are geared to rotate very slowly, and carry an outer platform on which a few seats are secured to seat certain patrons while others stand on the platform, the bar and the outer platform moving as a whole. An apparatus of this kind is an attraction or novelty by contrast with the stationary counter, but may impress one as monotonous because of its confined operation and very slow motion. It has therefore been my intention to design a development which is not only visibly different as a twin or double merry-go-round, so to speak, but which also has a fascinating travel feature whereby the patrons are carried from one counter to the other, while the counters rotate in reverse directions relative to each other.

Figure 1:
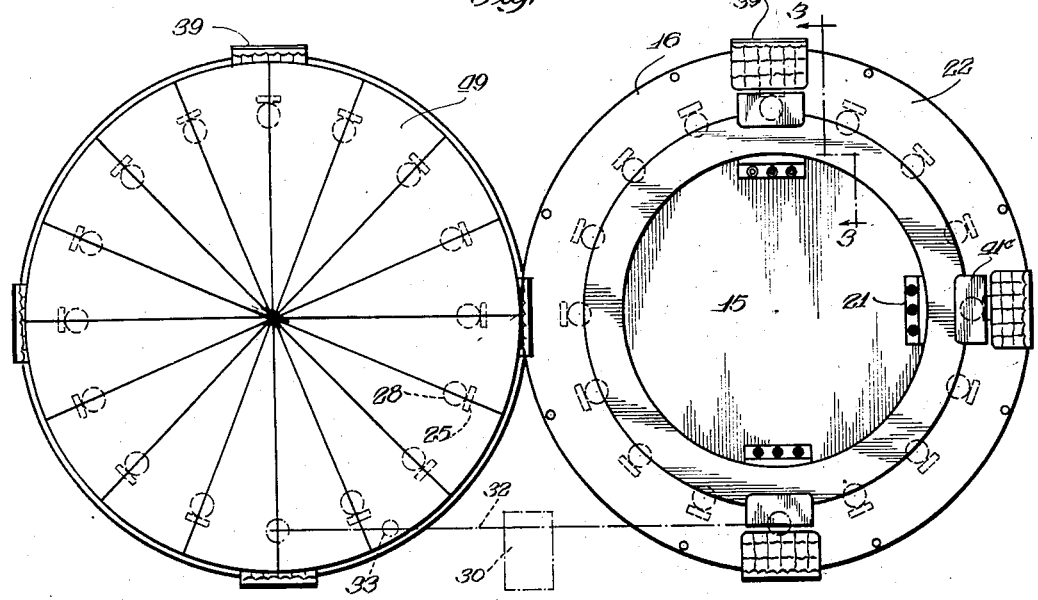
Fig. 1 is a plan view of the novel apparatus, taken on the line 1—1 of Fig. 2.
Figure 2:
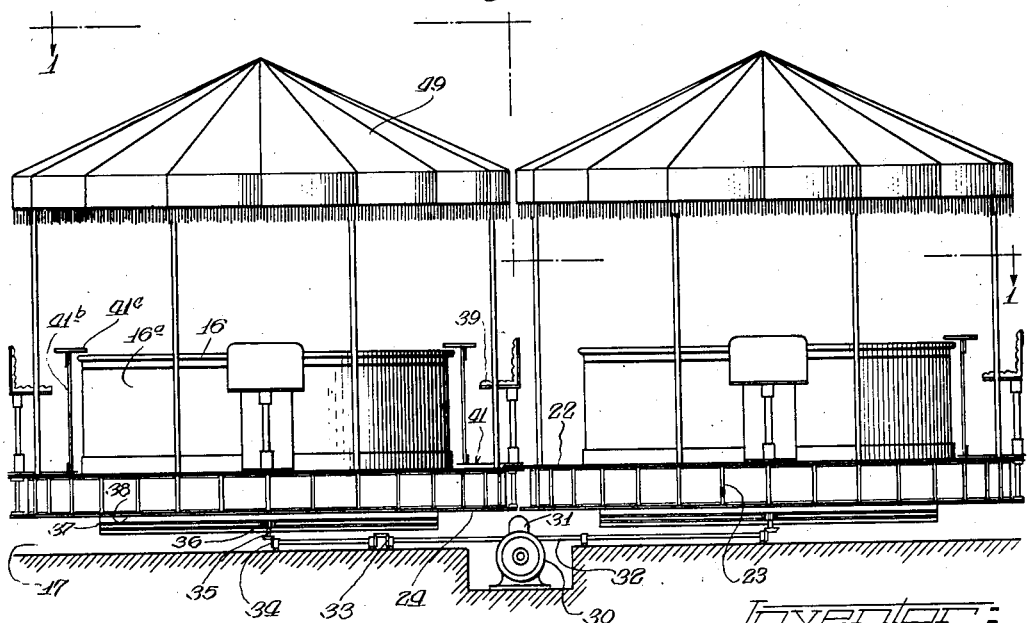
Fig. 2 is an elevation.

In carrying out the invention, specific reference to the drawings indicates a circular floor at 15 about which each counter unit is built, it being understood that both counter units are identical and arranged in laterally spaced order, as indicated in Fig. 2.

Figure 3:
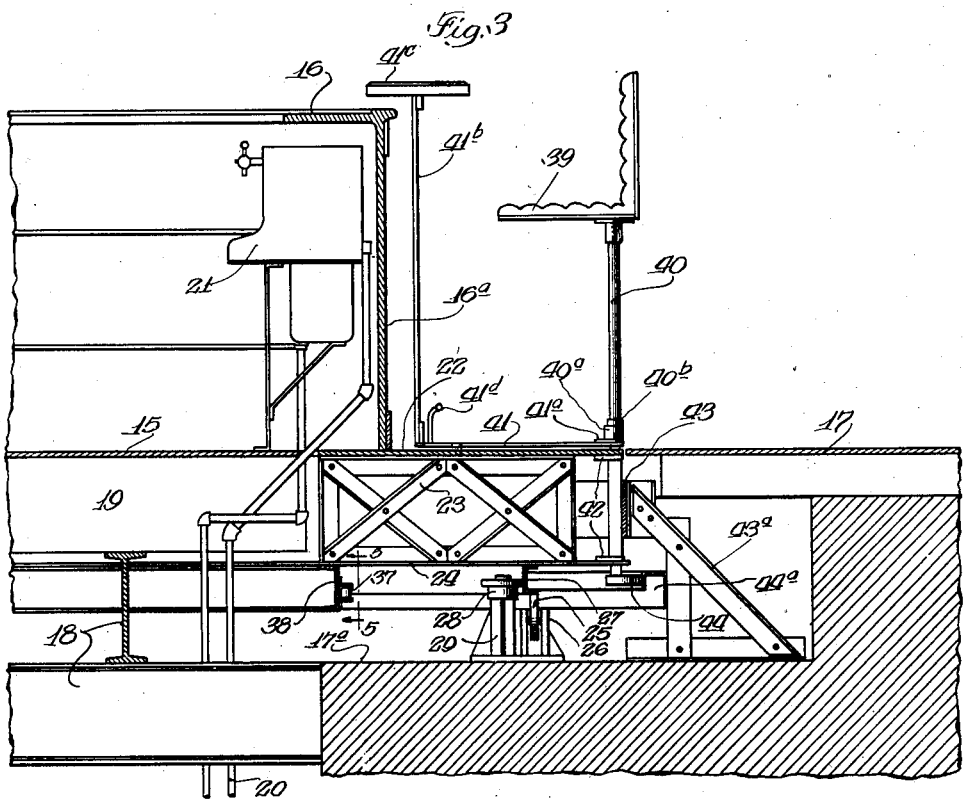
Fig. 3 is an enlarged section of a representative portion of the apparatus, taken on a line such as 3—3 of Fig. 1.

Each of the counters is indicated at 16 and has a circular outer wall 16a reaching down to the level of the floor 15. The floor 17 of the room in which the apparatus is installed is formed with a pit 17a to receive the mechanism involved in the apparatus, this pit receiving a superimposed arrangement of I-beams 18 or other suitable supports for a foundation of wood cross beams 19 on which the counter floor 15 is laid. As indicated in Fig. 3, I have shown a typical installation of plumbing 20 and refrigeration, serving, or dispensing equipment 21 installed in connection with the floor 15 and its foundation, this installation being within the confines of the counter, yet not connected therewith in any way, so that the counter may be geared for rotary motion without in any way affecting the equipment installed within it. This feature enables the equipment for the rotary counter to be installed by ordinary and relatively inexpensive means, in keeping with stationary installation methods.

The rotary counter 16 is built upon a circular base plate 22 filling the space between the floors 15 and 17, and the base plate 22 is supported by a series of radial frame work units 23 erected on a sub-plate 24, the latter being identical in form with the base plate 22.

As the assembly of the counter and parts 22, 23 and 24 is intended to rotate as one, I provide a rolling support for the same in the form of a series of wheels 25 mounted in bearing standards 26 and in a circular course. The sub-plate 24 receives on its under side a ring channel 27 which rides on the peripheries of the wheels 25 as the counter rotates. The assembly is guarded against lateral departure by a series of horizontal rollers 28 mounted in bearing standards 29, the rollers being in a circular course and with their peripheries bearing on the inner side of the ring channel 27, as clearly shown in Fig. 3.

Figure 5:
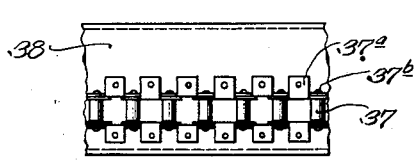
Fig. 5 is a section on the line 5—5 of Fig. 3.

In order that the rotary assembly may receive motion, I provide an electric motor or other power plant 30 as the motive source. A speed reducer 31 is preferably associated with the motor 30 in order to impart low speed to the power shaft 32, as indicated in Fig. 2. As the two counter units are intended to be rotated in reverse directions, I run one portion of the shaft 32 to a point under one of the units, and the other portion, including a reversing gear 33, under the other unit. The immediate connection of the shaft with each unit comprises a bevel gear drive 34 terminating with a vertical spindle 35 which carries a sprocket 36. This sprocket is opposite a chain formation 37 built on the outer face of a ring channel 38 carried by the sub-plate 24. A detail of the chain formation is shown in Fig. 5 and comprises a set of brackets 37a which carry laterally spaced pins 37b on which free rollers 37 are disposed. The teeth of the sprocket 36 enter between the rollers 37 and thus propel the ring channel 38 in a rotary course.

While the novel counter may be considered as having standing room in its platform 22, I prefer to provide the latter with a circular series of seats 39 for each counter unit. These may be of single width or of double width to seat two persons as shown in Fig. 2, and are mounted on vertical spindles 40 rotatable in bearings 40a and formed with collars 40b as stops over the bearings. Each bearing is also formed with a reinforcement 41a forming part of a bracket 41 which extends in the direction of the counter wall 16a. The bracket is built up with a post 41b on which is mounted a tray 41c, the latter being a short distance above the counter 16 and projecting partly over the same. The purpose of the tray is to receive such dishes or articles as the occupants of the particular seat desire to take from the counter in order to be retained when the seat departs from the given counter and assumes its place opposite the adjoining counter, where the particular dishes or articles may not be available. In case the counter serves as a bar, the bracket 41 is also provided with a foot rest 41d typical of a rail.

Beneath the base plate 22 the seat spindles 40 receive top and bottom flanges 42 making contact with the plates 22 and 24, respectively. Between the flanges, the spindles receive a lateral guide in the form of a horizontal ring 43 closely surrounding the circular series of spindles and having frame work supports 43a at suitable points. The inner face of the ring 43 is not in frictional contact with the spindles, but serves as a guard in case a spindle receives a distortional strain. Below the plate 24, each spindle carries a shoe 44 which extends outwardly and rides along the inner section of a channel ring 44a carried by the supports 43a and forms a brace against angular deviation of the spindle 40 from movement and weight strains imposed upon the seat 39.

The series of seats relating to either counter unit is carried with the counter by the connection of the spindles 40 with the plates 22 and 24. As indicated at 45x in Fig. 8, these plates are recessed in vertical registration opposite each spindle to receive the same, and it follows that the rotation of the plates 22 and 24 will carrying the spindles around. However, it is the purpose of my invention to transfer each seat from a given rotary counter to the adjoining one at the point of co-incidence between the counter assemblies, and the plates 22 and 24 of one counter unit therefore overlap the corresponding plates of the adjoining counter unit, as suggested in Figs. 4, 7 and 8, the recesses 45x registering by the rotation of the plates at the same rate of speed and in reverse directions. Thus, when a set of recesses is in vertical registration, the corresponding spindle 40 may be said to be common to both counter units. Therefore, in order that it may pass from one counter unit to the next, the ring 43 and the channel 44a are interrupted in the zone of coincidence to provide clearance. While the spindle may be considered as deprived of lateral support or guidance during the incident of passage, it must be explained that this incident is short and that the flanges 42 have sufficient area and stability to maintain the spindle in firm position during the change.

Figure 4:
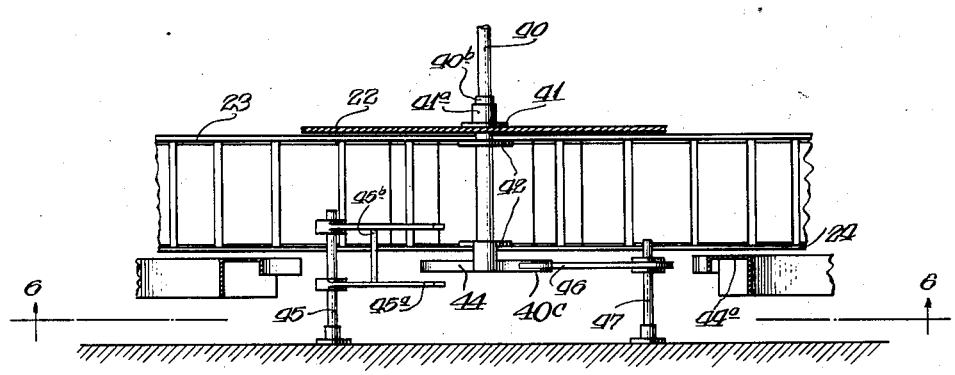
Fig. 4 is a section on the line 4—4 of Fig. 6.

Figs. 4 and 6 illustrate the mechanism which procures the transition of a given seat from one counter to the other. It is seen that the shoe 44 is extended to form a two-armed cam 40c having hollows 40d on the inner side of its arms. Between the counter units is a standard 45 which has a pair of vertically spaced arms 45a extended toward the point of coincidence and carrying between them a vertical pin 45b. With the motion of the counter units denoted by arrows in Fig. 6, it will be seen that the cam 40c at the left bottom is intercepted in the hollow 40d of its arm by the pin 45b as indicated by dotted lines, such pin forming a detent on the further progress of the spindle to turn the same a half-revolution to the full line position shown in the center of Fig. 4. Here the present fore-arm of the cam meets the inner side of a selector guide 46 carried by a standard 47 and having a short pivotal motion. The selector forms an abutment toward the affected arm of the spindle and prevents it from continuing with the counter unit in which it came, thereby permitting the adjoining counter unit to take the spindle with it as the units continue to rotate, the selector 46 maintaining the spindle in engagement with the latter unit in the meantime. It will be seen that the so-called floating spindle has been transferred from one counter unit to the other by simple and automatic means, and that these means have also served to twist the spindle through a half-turn, so that the seat which has faced the first counter will also face the second counter after the transfer.

The continued motion of the apparatus causes the forearm of the cam 40c to impinge on a heel 46a of the selector 46—see top of Fig. 6—and so swing the selector about its pivotal standard 47 toward the right and to a similar distance on the other side of the center. Now the selector is in a position to receive a spindle coming from the bottom of the right hand counter unit as seen in Fig. 6, and to guide such spindle to the left hand counter unit after reaching the point of coincidence. It will be obvious from the above action that the patrons will not only experience the ordinary merry-go-round motion incident to rotary bars or counters but will also pass from one counter to the other with the incidental twist in the nature of a thrill, continuing the ride in the form of a figure-8. In the case of a bar, the service had is versatile, since sandwiches or foods may be served at one of the counters and drinks at the other counter.

The modification of Fig. 7 shows an extension of the cam 40c with retainer arms 40e to confine the space in the hollows 40d. This modification is intended to add steadiness and stability to the spindle during the turn.

The modification of Fig. 8 is intended for a merry-go-round of the toy or carnival type wherein the principle of the twin units is desirable. It is seen that the selector device is employed for the seats or horses represented at 48 in order to procure their travel along the figure-8 course, but that the turning or twisting mechanism is eliminated as unnecessary.

Fig. 2 shows the counter type of apparatus embellished with canopies 49 for purposes of ornament or where the installation is on open grounds. Needless to say, various accessories or refinements conducive to efficient operation and best service may be included in the apparatus as engineering and fancy may dictate. However, the principle of the apparatus provides a counter installation and service which is useful, unique, fascinating and relatively simple in construction.

I claim:

1. A traveling counter apparatus comprising a pair of laterally arranged counters, means for rotating the same in reverse directions and at the same speed, outer circular extensions of the counters and overlapping at a point of coincidence, said extensions being marginally recessed at spaced intervals with the recesses of the respective extensions registering at the point of coincidence, vertical spindles in the recesses of the extensions, chair-like seats carried by the spindles, cams carried by the spindles and guides adjacent to the extensions and effective upon the cams to lead each spindle arriving at the point of coincidence from the recess of the counter carrying it to that of the adjoining counter.

2. The structure of claim 1, the cams being two-armed and along one side of the spindles.

3. The structure of claim 1, and means carried by the guide to move it by the passage of the spindle from one counter whereby to act in the opposite direction for the passage of the next spindle from the other counter.

4. The structure of claim 1, said guide being an arm pivoted for a limited lateral movement.

5. The structure of claim 1, and means carried by the guide to move it by the passage of the spindle from one counter whereby to act in the opposite direction for the passage of the next spindle from the other counter, said means comprising a lug projected from the guide and movable by the passing of the cam to shift the guide.

6. A traveling counter apparatus comprising a circular counter, stationary service means on the inner side of the same, means to rotate the counter, a platform carried by the latter, seats arranged in a circular series on the platform, stands erected on the platform between the respective seats and the counter, and individual tables carried by the stands above the counter.

7. A traveling counter apparatus comprising a pair of laterally arranged counters, and means for rotating the same in reverse directions, seats carried by the counters, and means for transferring the seats from one counter to the other.

8. A traveling counter apparatus comprising a pair of laterally arranged counters, means for rotating the same in reverse directions, seats carried by the counters, and means for inducing the travel of the seats from one counter to the other in a path represented by a figure-8.

9. A traveling counter apparatus comprising a pair of laterally arranged counters, means for rotating the same in reverse directions, chair-like seats carried by the respective counters and facing the same, means for inducing the transfer of the seats from one counter to the other and vice versa, and other means for turning the seats during the transfer from one counter to face the other counter.

10. A traveling counter apparatus comprising a pair of laterally arranged counters, means for rotating the same in reverse directions, chair-like seats carried by the respective counters and facing the same, cams carried by the seats, and guides effective upon the cams to transfer the seats from one counter to the other.

11. A traveling counter apparatus comprising a pair of laterally arranged counters, means for rotating the same in reverse directions, chair-like seats carried by the respective counters and facing the same, means for inducing the transfer of the seats from one counter to the other and vice versa, other means for turning the seats during the transfer from one counter to face the other counter, spindles carrying the seats, cams carried by the spindles, and a detent effective on the cams to impart a half turn to the spindles during the progress of the counters, the detent being positioned to receive the cams at a point proximate to the transfer zone of the seats.

12. The structure of claim 11, said detent being a vertical stem carried by a vertically pivoted frame.

13. The structure of claim 11, said cams being two-armed and the arms having a hollow on the side meeting the detent.

14. A traveling counter apparatus comprising a pair of laterally arranged counters, means for rotating the latter, seats carried by the counters, and means for transferring the seats from one counter to the other.

15. The structure of claim 9, and individual tables carried by the seats opposite the counters and turning with the seats on the transfer.

16. A traveling counter apparatus comprising a circular counter, means to rotate the counter, a platform carried by the latter, seats arranged in a circular series on the platform, stands erected on the platform between the respective seats and the counter, and individual tables carried by the stands above the counter.

17. A traveling counter apparatus comprising a floor having a circular opening, a counter of table-height erected in the middle portion of the opening and rotatable about the axis of the latter, and a floor-level platform carried by the counter and extending outwardly therefrom substantially to the edge of said opening.

18. A traveling counter apparatus comprising a pair of laterally arranged counters, means for rotating the same in reverse directions, chair-like seats carried by the respective counters and facing the same, means to transfer the seats from one counter to the other, vertical spindles carried by the seats, a guard ring about the spindle group, and shoes extended from the latter for guidance along the ring to check tilting tendencies of the seats.

19. A traveling counter apparatus comprising a pair of laterally arranged counters, means for rotating the same in reverse directions, chair-like seats carried by the respective counters and facing the same, means to transfer the seats from one counter to the other, vertical spindles carried by the seats, and a guard ring next outside the spindle group and forming an abutment for the spindles against tilting tendencies of the seats.

JAMES M. MASTORAS.